S. E. BRADLEY.
INDICATING DEVICE.
APPLICATION FILED MAY 2, 1921.
1,402,395.
Patented Jan. 3, 1922.
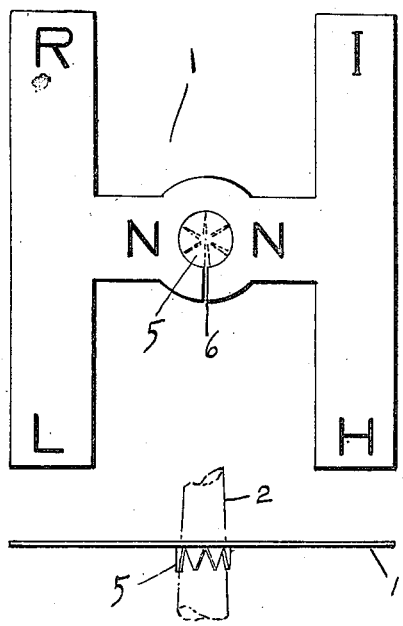
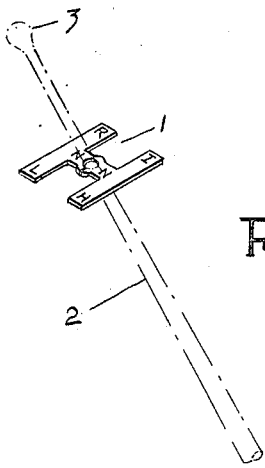
INVENTOR
STANLEY E. BRADLEY.
BY
ATTORNEY

UNITED STATES PATENT OFFICE.

STANLEY E. BRADLEY, OF EAST ORANGE, NEW JERSEY.

INDICATING DEVICE.

1,402,395.  Specification of Letters Patent.  Patented Jan. 3, 1922.

Application filed May 2, 1921. Serial No. 466,345.

*To all whom it may concern:*

Be it known that I, STANLEY E. BRADLEY, a citizen of the United States, residing at East Orange, in the county of Essex and State of New Jersey, have invented certain new and useful Improvements in Indicating Devices, of which the following is a full, clear, concise, and exact description.

My invention relates to means for teaching individuals to drive a motor vehicle and more particularly an automobile in which the transmission gears are shifted by a lever.

In learning to drive an automobile, it is largely a question of coordinating one's faculties so that the proper step is taken or thing done at the right time. One of the things which usually causes beginners considerable concern is the shifting of the transmission gears.

It is an object of my invention to provide means for materially assisting the person learning to drive an automobile by visualizing the movements of the gear shift lever during the shifting of the gears.

Another object of the invention is the provision of a simple and inexpensive device of the character described which may be conveniently attached to the gear shift lever of the motor vehicle.

Other objects of the invention have to do with various features of construction and combination of parts hereinafter set forth and defined by the appended claims.

In accordance with my invention there is provided an indicating device having the configuration of the letter H and bearing reference characters or markings to indicate the respective positions to which the gear shift lever is thrown in shifting the gears of a motor vehicle such as an automobile. Means are provided on the device which render it quickly attached to the gear shift lever.

Referring to the accompanying drawings;

Figure 1 is a plan view of a form of the device contemplated by the invention;

Figure 2 is a side elevation of the device, shown in Figure 1, applied to a gear shift lever, parts of which are broken away; and Figure 3 is a perspective view of my device attached to the usual form of gear shift lever found on most makes of automobiles.

An indicating device 1 such as shown in the drawings may be formed of a piece of card board having the configuration or outline of the letter H with suitable reference characters applied thereto so as to suggest the respective positions to which the gear shift lever may be moved in driving a given automobile.

For the sake of convenience, the device will be described in combination with what is known as a standard gear shift. The reference character R indicates reverse; L, I, and H, low, intermediate and high speeds respectively, and N neutral position.

In operating the gear shift lever 2, the construction and actuation of which is sufficiently well known as not to require description thereof, the top or knob portion 3 describes substantially the contour of the letter H during the moving of the gears (not shown) in going from the usual three speeds forward and reverse position; the cross-bar of the H being represented by the neutral position. Starting with the gear shift lever 1 in neutral (N) position, the reverse (R) gear is thrown into mesh by moving the gear shift lever 2 to the left and forward, thus forming the upper left leg of the letter H. When shifting the gears from reverse to low (L) speed the gear shift lever is moved straight back to its extreme position thus causing the movement of the lever to describe the left half of the letter H. To move the gears to second or intermediate (I) speed, the lever 2 is moved forward to neutral position, thence to the extreme right and again forward the full stroke of the lever. This movement traces the cross-bar and upper right half of the letter H. In shifting the gears from intermediate to high (H) speed, the lever 2 is moved rearwardly its full distance, thus completing the formation of an H. In going from high speed to any other position, some portion of the letter, capital H is described.

In attaching the indicating device 1 to the gear shift lever 2, an aperture may be provided centrally of the cross-bar of the H and by removing the knob 3, the device 1 may be slipped over the end of the lever 2. For the sake of rigidity, the portion of the cross-bar at the point where the aperture is made may be reinforced in any suitable manner as by providing additional material in this locality such as shown in the drawings. This feature may be easily taken care of in the punching of the device from a card board or other suitable blank. Instead of merely punching an aperture in the cross-bar through which to insert the lever 2, the material removed in making the aperture may be utilized by forming a plurality of slits 5 radiating from a common central point and so designed as to afford a yielding contacting surface (see Figure 2) for engagement with the lever 2. A slot 6 provides means for inserting the lever 2 within the apertured portion of the crossbar of the H.

From the foregoing description, it may be seen that the principal feature of my invention resides in an indicating device, the configuration of which similates the various movements of a movable element; that these movements are attempted to be suggested or visualized not only by the contour of the indicating device but by suitable reference characters appropriately positioned. Furthermore, the device may be secured directly to the movable element or may be placed in such position with respect thereto as to be as effective as if carried by the same.

While my invention has been set forth in a preferred embodiment, it will be understood that modifications may be made by those skilled in the art without departing from the spirit and scope thereof. For example, the general contour of the device may be changed; its place of attachment likewise changed, etc., but all such modifications are desired to be regarded as contemplated by the invention as defined in the appended claims.

What is claimed is:

1. An indicating device having a body portion indicative of the movements of a movable element, said device being adapted to move with said element and visualize the various positions through which said element may be caused to travel.

2. An indicating device designed to be attached to a movable element and adapted to visualize the various positions through which said element may be caused to travel, said device being so positioned with respect to said element as to clearly display to an operator any reference characters that may be applied to the said device.

3. An indicating device adapted to be supported by a movable element and having a body portion similating in contour a series of movements intended to be visualized.

4. An indicating device designed to be attached to a movable element but incapable of exercising any control thereover, said device being adapted to vizualize the various positions to which said movable element may be caused to travel.

5. An indicating device comprising a piece of thin material and adapted to be supported by a movable element, said device having a contour similating the series of movements intended to be visualized by the general outline of the device, and having reference characters applied thereto of such a nature as to suggest the positions to which said movable element may be caused to travel.

6. The combination with a gear shift lever, of an indicating device comprising a body portion, means for attaching said device to said lever, the configuration and relative position of said device with respect to said lever being such as to materially aid in the visualization of the movements of said lever.

7. The combination with a gear shift lever, of an indicating device comprising a body portion, means for attaching said device to said lever, the configuration and relative position of said device with respect to said lever being such as to materially aid in the visualization of the movements of said lever, and reference characters suitably applied to said device and of such a nature as to suggest or indicate the several positions to which said lever may be shifted.

8. The combination with a gear shift lever, of an indicating device comprising a body portion having substantially the configuration of the letter H, means for attaching said device to said lever, the relative positions of said device and lever being such as to materially assist in the visualization of the movements of the lever.

9. The combination with a gear shift lever, of an indicating device designed to be supported thereon and adapted to simulate the several positions to which the gear shift lever may be caused to travel.

10. The combination with the lever of a standard gear shift, of an indicating device attached thereto and designed to simulate the several positions to which said lever may be caused to travel.

11. The combination with a movable element of an indicating device designed to be supported thereon and adopted to visualize the several positions through which said element may be caused to travel.

12. The combination with a movable element of an indicating device designed to be supported thereon and adopted to visualize the several positions through which said element may be caused to travel, said visualization being produced by simulation of the general outline of the movements intended to be visualized.

In testimony whereof, I have hereunto subscribed my name this 27th day of April, 1921.

STANLEY E. BRADLEY.